(12) United States Patent
Ranganathan

(10) Patent No.: US 8,565,538 B2
(45) Date of Patent: *Oct. 22, 2013

(54) DETECTING AND LABELING PLACES USING RUNTIME CHANGE-POINT DETECTION

(75) Inventor: Ananth Ranganathan, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 13/044,287

(22) Filed: Mar. 9, 2011

(65) Prior Publication Data

US 2011/0229032 A1    Sep. 22, 2011

Related U.S. Application Data

(60) Provisional application No. 61/314,461, filed on Mar. 16, 2010.

(51) Int. Cl.
*G06K 9/62* (2006.01)

(52) U.S. Cl.
USPC ........... 382/225; 382/171; 382/190; 382/275; 348/335

(58) Field of Classification Search
USPC .................. 382/171, 190, 225, 275; 348/335
See application file for complete search history.

(56) References Cited

U.S. PATENT DOCUMENTS

| | | | | |
|---|---|---|---|---|
| 5,299,284 | A * | 3/1994 | Roy ................................ | 706/20 |
| 5,546,475 | A | 8/1996 | Bolle et al. | |
| 6,393,423 | B1 * | 5/2002 | Goedken ............................. | 1/1 |
| 6,404,925 | B1 * | 6/2002 | Foote et al. .................... | 382/224 |
| 6,807,312 | B2 * | 10/2004 | Thomas et al. ............... | 382/253 |
| 7,555,165 | B2 | 6/2009 | Luo et al. | |
| 7,949,186 | B2 * | 5/2011 | Grauman et al. ............. | 382/170 |
| 2007/0041638 | A1 * | 2/2007 | Liu et al. ....................... | 382/170 |
| 2009/0060340 | A1 | 3/2009 | Zhou | |
| 2009/0290802 | A1 | 11/2009 | Hua et al. | |

FOREIGN PATENT DOCUMENTS

JP           2003157439           5/2003

OTHER PUBLICATIONS

Torralba, A. et al., "Context-Based Vision System for Place and Object Recognition," Mar. 2003, AI Memo May 2003; Massachusetts Institute of Technology—Artificial Intelligence Laboratory, eleven pages.

* cited by examiner

*Primary Examiner* — Chan S Park
*Assistant Examiner* — Eueng-Nan Yeh
(74) *Attorney, Agent, or Firm* — Fenwick & West LLP; Mark Duell

(57) ABSTRACT

A system and method are disclosed for detecting and labeling places recognized in a video stream using change-points detection. The system includes a segmentation module and a label learning module. The segmentation module is configured to receive a video stream comprising multiple digital representations of images. The video stream is represented by a measurement stream comprising one or more image histograms of the video stream. The segmentation module segments the measurement stream into multiple segments corresponding to place recognized in the videos stream. The segmentation module detects change-points of the measurement stream and computes probability distributions of the segments over multiple pre-learned place models. The label generation module is configured to generate place labels for the places recognized by the place models.

21 Claims, 10 Drawing Sheets

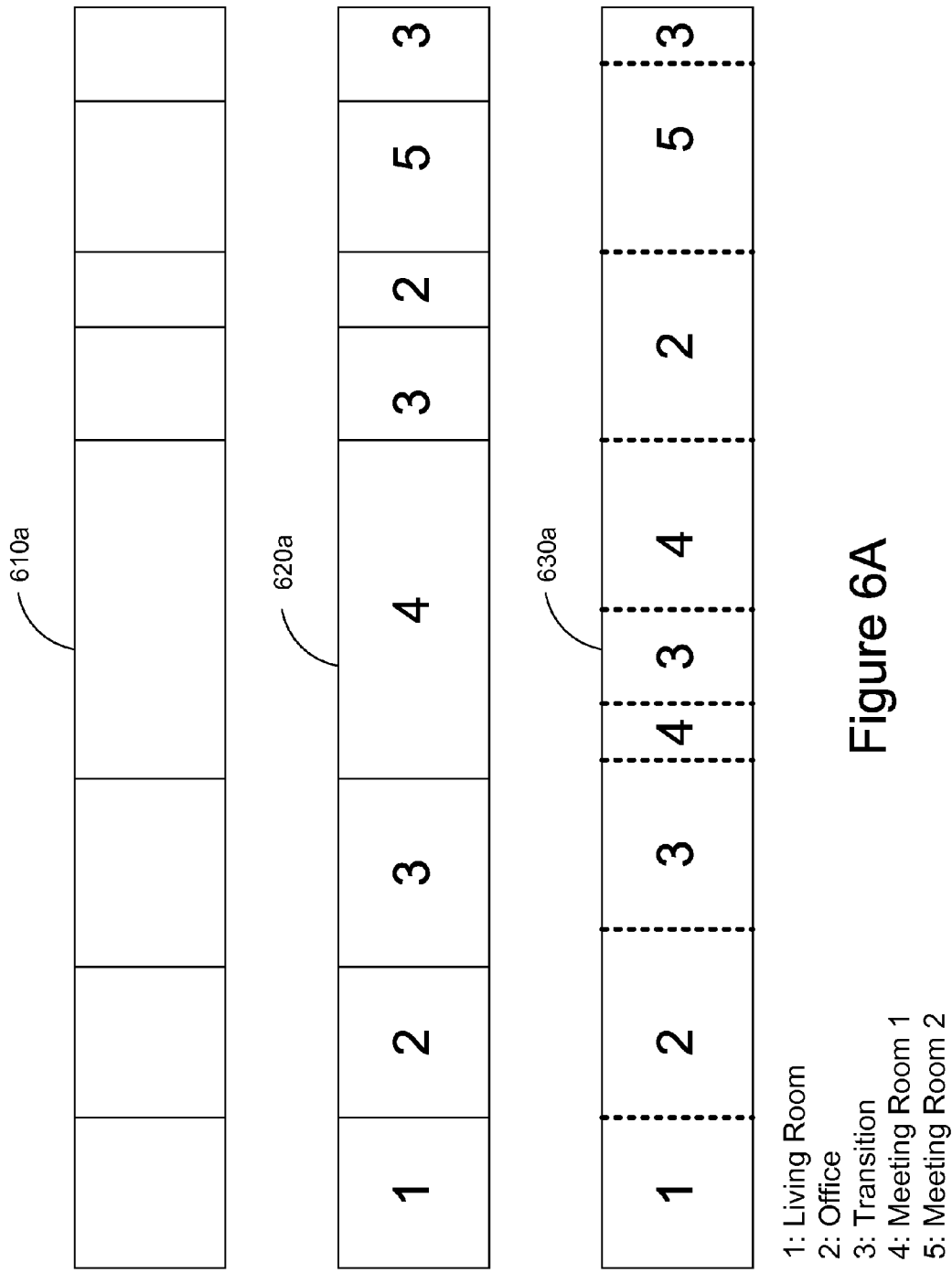

DETECTING AND LABELING PLACES USING RUNTIME CHANGE-POINT DETECTION

CROSS REFERENCE TO RELATED APPLICATIONS

This application claims the benefit of U.S. Provisional Application No. 61/314,461, filed Mar. 16, 2010, entitled "PLISS: Detecting and Labeling Places Using Online Change-Point Detection," which is incorporated by reference in its entirety.

FIELD OF THE INVENTION

The invention relates generally to place classification in image processing systems, and in particular to labeling places using model-based runtime change-point detection.

BACKGROUND OF THE INVENTION

In computer image analysis such as intelligent transportation systems, a common task is to consistently classify and label places in a captured image scene. For example, place recognition is the task of consistently labeling a particular place (e.g., "kitchen on 2nd floor with a coffee machine") every time the place is visited, while place categorization is to consistently label places according to their category (e.g., "kitchen", "living room"). Place recognition and categorization are important for a robot or an intelligent agent to recognize places in a manner similar to that done by humans.

Most existing place recognition systems assume a finite set of place labels, which are learned offline from supervised training data. Some existing place recognition systems use place classifiers, which categorize places during runtime based on some measurements of input data. For example, one type of place recognition method models local features and distinctive parts of input images. Alternatively, a place recognition method extracts global representations of input images and learns place categories from the global representations of the images.

Existing place recognition systems face a variety of challenges including the requirement of large training data and limited place recognition (e.g., only recognizing places known from training data). For example, existing place recognition methods in robotics range from matching scale-invariant feature transform (SIFT) features across images to other derived measures of distinctiveness for places such as Fourier signatures, subspace representations and color histograms. These methods have the disadvantage of not being able to generalize and also are invariant to perspective mainly through the use of omnidirectional images.

BRIEF DESCRIPTION OF THE DRAWINGS

FIG. 6A is a block diagram of an example experimental result of labeling places using change-point detection according to one embodiment of the invention.

DETAILED DESCRIPTION OF THE INVENTION

Figure 1A:
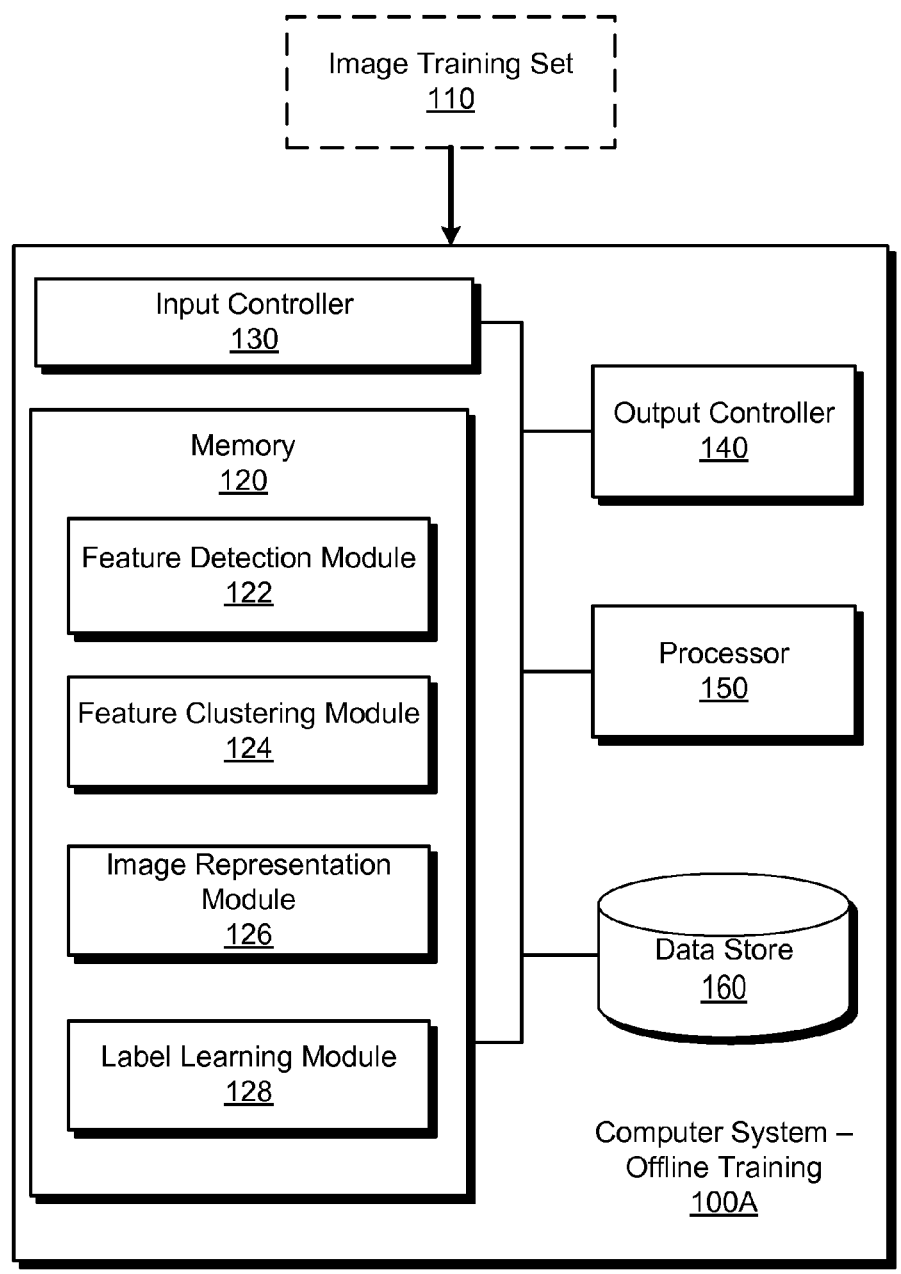
FIG. 1A illustrates a computer system for learning place models during offline training according to one embodiment of the invention.

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

Embodiments of the invention provide a place recognition method/system for labeling places of a video/image sequence using runtime change-point detection. A video/image sequence is represented by a measurement stream comprising multiple image histograms of feature frequencies associated with the video/image sequence. The measurement stream is segmented into segments corresponding to places recognized in the video/image sequence based on change-point detection. Change-point detection is to detect abrupt changes to the parameters of a statistical place model. By detecting the changes in the parameters of the statistical place model modeling a video/image sequence, the place boundaries in the video/image sequence are obtained, where a place is exited or entered at each place boundary.

One embodiment of a disclosed system includes a segmentation module for providing place boundaries in a video/image stream. The segmentation module is configured to compute the probability of a change-point occurring at each time-step of the segments of a measurement stream representing a video/image stream. The segmentation module tracks the probabilities of detected change-points in the measurement stream. The probability of a change-point at any given time-step is obtained by combining a prior on the occurrences of change-points with the likelihood of the current measurement of the measurement stream given all the possible scenarios in which change-points could have occurred in the past.

One embodiment of a disclosed system also includes a place label generation module for labeling places known or unknown to pre-learned place models. The place label generation module is configured to assign place labels probabilistically to places in a video/image sequence based on the measurements of the measurement stream representing the video/image sequence, the most recently assigned place label and change-point distribution. Statistical hypothesis testing can be used to determine if the current measurement could have been generated by any of pre-learned place models. If a measurement cannot be generated by a pre-learned place model, the measurement is determined to be a previously unknown place and is assigned a new place label.

System Overview

The place recognition problem described above can be formulated as follows. Given a measurement stream representing a video/image sequence, measurements at some (possibly changing) intervals are generated. For simplicity, the intervals are referred to as time-steps. In one embodiment, an image from a video/image sequence is represented by one or more image histograms of feature frequencies associated with the image. Each image of the video/image sequence is represented by a spatial pyramid of multiple image histograms of feature frequencies associated with the image. For simplicity, histograms of feature frequencies associated with the image from the video/image sequence are referred to as image histograms. The image histograms of a video/image sequence forms a measurement stream of the video/image sequence, where the each image histogram is a measurement of the measurement stream.

It is noted that a place label remains the same for periods of time when a robot is moving inside a particular place. The place label only changes sporadically when the robot travels into the next place. Thus, a measurement stream representing a video sequence at runtime can be segmented into segments corresponding to places recognized in the video sequence, where measurements in each segment are assumed to be generated by a corresponding place model. The start and end of a segment where the corresponding place model associated with the segment changes are referred to as "change-points." The change-points of a segment provide a reliable indication regarding the place label of the segment.

For each measurement, a label corresponding to the type of the place (e.g., kitchen, living room, office) is generated. If a measurement does not correspond to any type of the place, the measurement is likely to represent an unknown place. In one embodiment, the place types are given in the form of L place models $M_1, M_2, \ldots M_L$. The place models $M_1, M_2, \ldots M_L$ are learned offline from pre-labeled training data. An example computer system for learning the place models offline from pre-labeled training data is further described below with reference to FIG. 1A. An example computer system for detecting and labeling places using change-point detection at runtime is further described below with reference to FIG. 1B.

Figure 2:
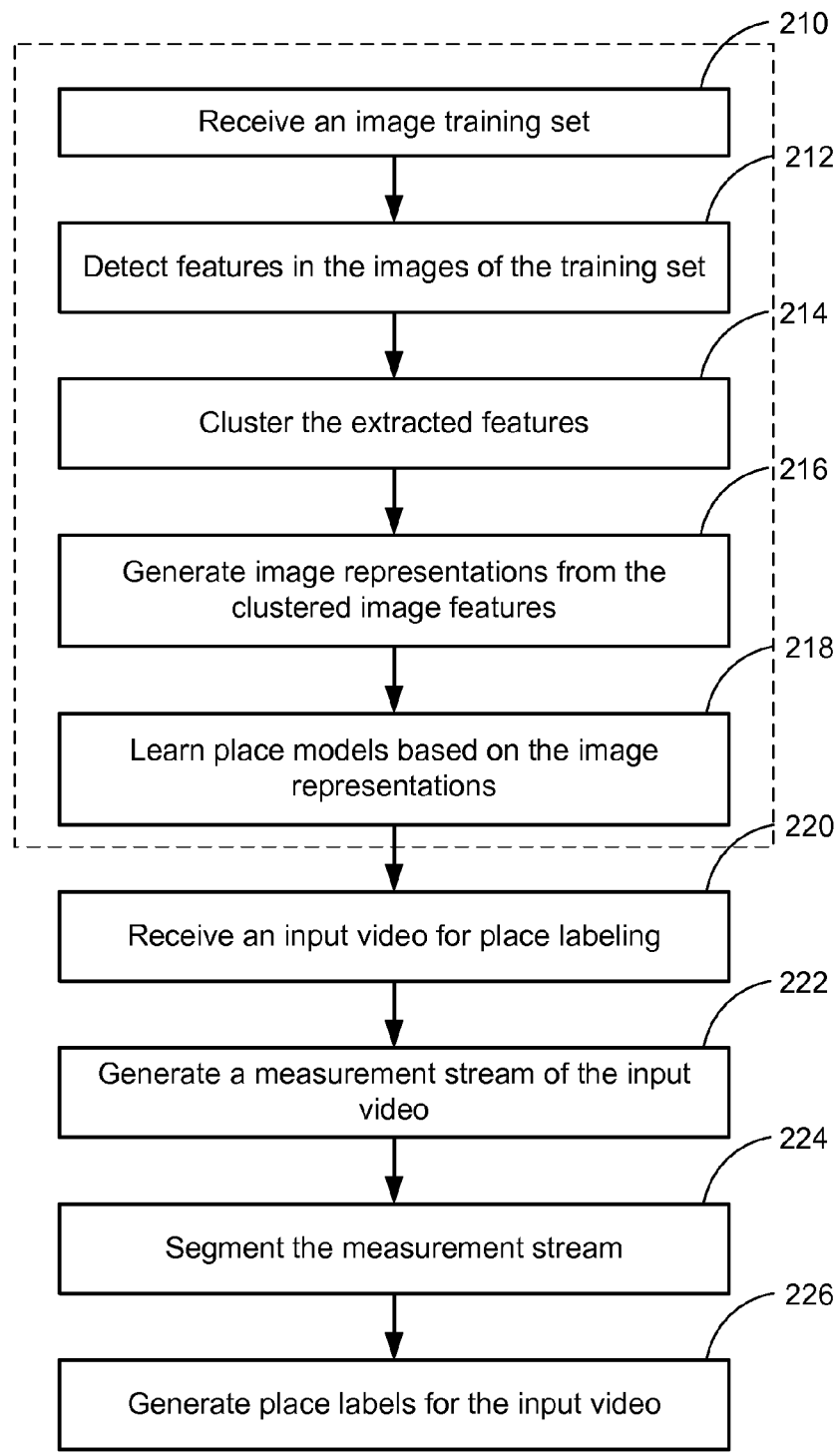
FIG. 2 is a system level flowchart of learning place models and labeling places using change-point detection according to one embodiment of the invention.

FIG. 2 is a system level flowchart of detecting and labeling places using change-point detection according to one embodiment of the invention. A place recognition system for place labeling first learns place models offline from an image training set and applies the learned place models to an input video at runtime to generate place labels for the input video. Initially, the place recognition system receives 210 an image training set and detects 212 features (e.g., image features and/or texture features) in the images of the training set. The place recognition system extracts and clusters 214 the features into one or more sets of feature vectors. From the clustered features, the place recognition system generates 216 image representations (e.g., spatial pyramid of image histograms) and learns 218 the place models based on the image representations.

At run time, the place recognition system receives 220 an input video for place labeling. The place recognition system generates image representations (e.g., spatial pyramids of image histograms) of images of the input video. The spatial pyramids of image histograms of images at different spatial resolutions are combined to generate 222 a corresponding measurement stream of the input video. The place recognition system segments 224 the measurement stream into multiple segments. Using the learned place labels, the place recognition system generates 226 place models for the input video.

Image Representation by Image Histograms

Turning now to FIG. 1A, FIG. 1A illustrates a computer system 100 for learning place models offline from pre-labeled training data according to one embodiment of the invention. The computer system 100A comprises a memory 120, an input controller 130, an output controller 140, a processor 150 and a data store 160. In one embodiment, the computer system 100A is configured to receive an image training set 110 for learning place models from the image training set 110.

The image training set 110 comprises multiple pre-labeled images. In one embodiment, the image training set 110A comprises video sequences obtained from Visual Place Categorization (VPC) dataset. The dataset contains image sequences from six different homes, each containing multiple floors. The data set from each home consists of between 6000 and 10000 frames. In one embodiment, image sequences from each floor are treated as a different image sequence. The dataset has been manually labeled into 5 categories (e.g., living room, office) to provide ground truth for the place categorization problem to be solved by the disclosed method/system. In addition, a "transition" category is used to mark segments that do not correspond determinatively to any place category.

The memory 120 stores data and/or instructions that may be executed by the processor 150. The instructions may comprise code for performing any and/or all of the techniques described herein. Memory 120 may be a DRAM device, a static random access memory (SRAM), Flash RAM (non-volatile storage), combinations of the above, or some other memory device known in the art. In one embodiment, the memory 120 comprises a feature detection module 122, a feature clustering module 124, an image representation module 126 and a label learning module 128. The feature detection module 122 detects and extracts image features and/or textures from the images in the image training set 110. The feature clustering module 124 groups the extracted image/texture features into clusters. The image representation module 126 generates image representations of images of the image training set 110. The label learning module 128 learns multiple place models from the image representations and stores the learned place models in the data store 160.

The feature detection module 122 comprises computer executable instructions for detecting and extracting image/texture features from input images. In one embodiment, the feature detection module 122 detects scale-invariant feature transform (SIFT) features on a dense grid on each of a set of input images. SIFT is a way to detect and describe local features in an image by detecting multiple feature description key points of objects in an image. The feature detection module 122 extracts SIFT features by transforming an input image into a large collection of feature vectors, each of which is invariant to image translation, scaling and rotation and partially invariant to illumination and to local geometric distortion.

In another embodiment, the feature detection module 122 detects CENTRIST features from input images. CENTRIST is based on census transform of an image, which is a local feature computed densely for every pixel of the image, and encodes the value of a pixel's intensity relative to that of its neighbors. The feature detection module 122 computes census transform by considering a patch centered at every pixel of an image. The transform value is a positive integer that takes a range of values depending on the size of the patch. For instance, a patch size of 3, where there are 8 pixels in the patch apart from the central pixel, has transform values between 0 and 255.

In yet another embodiment, the feature detection module 122 detects texture features of the input images. Texture feature of an image is a function of the spatial variation in pixel intensities (e.g., gray values) of the image. The feature detection module 122, in one embodiment, extracts texture features from the input images using 17-dimensional filter bank (e.g., Leung-Malik filter bank).

The feature clustering module 124 comprises computer executable instructions for clustering features extracted by the feature detection module 122. In one embodiment, the feature clustering module 214 clusters the extracted SIFT image features by quantizing the image features using K-means to create a codebook/dictionary of code words of a pre-specified size. A code word of the dictionary is represented by a cluster identification of the quantized image feature. Similar to SIFT image features clustering, the feature clustering module 124 uses K-means to cluster texture features of the input images to create a dictionary comprising the cluster identifications of the quantized texture features.

The image representation module 126 comprises computer executable instructions for representing input images by image histograms. For example, an image of a video sequence is represented by one or more image histograms of feature frequencies associated with the image. The image histograms of a video sequence forms a measurement stream for segmentation and place label generation at runtime. The image histograms are the measurements in the change-point detection procedure described below.

In one embodiment, the image representation module 126 uses a spatial pyramid of image histograms to represent an image of a video sequence at different spatial resolutions. Specifically, the image representation module 126 obtains a spatial pyramid of an image by computing histograms of feature frequencies at various spatial resolutions across the image. The histogram bins contain the number of quantized image features in each of the image feature clusters in the image region being processed. The image representation module 126 divides the image into successive resolutions. In one embodiment, the image representation module 126 only computes the image histograms at the finest resolution since the coarser resolution image histograms can be obtained by adding the appropriate image histograms at an immediately finer level. All the image histograms from the different resolutions are then concatenated to produce the spatial pyramid representation of the image.

To compute the spatial pyramid of image histograms of an image, the image representation module 126 needs two parameters: the number of levels in the spatial pyramid and the number of feature clusters. Taking a spatial pyramid based on SIFT features of an image as an example, the image presentation module 126 computes the spatial pyramid of the image using the number of levels in the pyramid corresponding to the number of spatial resolutions of the image and the number of the image clusters computed in SIFT space (i.e., the size of the codebook). SIFT features have local information about an image patch while an image histogram has global information. By combining both of SIFT features and image histogram at different scales, the spatial pyramid of image histograms obtains more fine-grained discriminative power of the image.

In addition to SIFT features, the image representation module 126 can compute spatial pyramids using two other features, CENTRIST and texture. For example, the image representation module 126 computes a census transform histogram of an image based on the CENTRIST features extracted from the image. One advantage of using CENTRIST features to compute the image histograms is the image representation module 126 can directly compute the census transform histograms from the CENTRIST features without clustering the features, thus with reduced computation load. In another embodiment, the image representation module 126 computes a texture-based spatial pyramid of an image using texture features of the image.

Figure 4A:
FIG. 4A is an example image at a first spatial resolution to be represented by an image histogram.
Figure 4B:
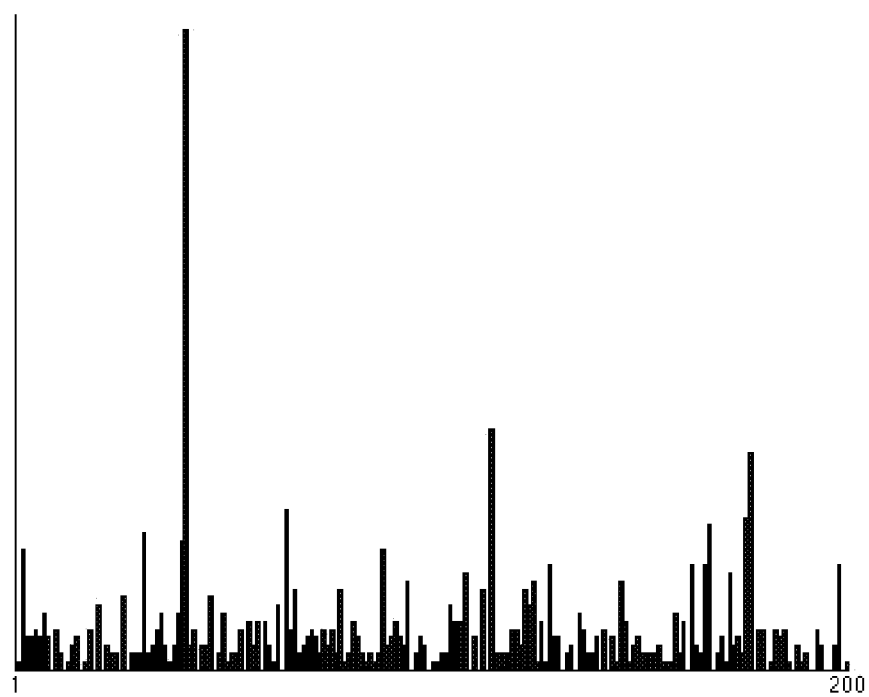
FIG. 4B is a corresponding image histogram of the image illustrated in FIG. 4A according to one embodiment of the invention.

Turning to FIG. 4, FIG. 4A is an example image at its original spatial resolution (e.g., pyramid level 1). FIG. 4B is a corresponding image histogram of the clustered SIFT features extracted from the input image illustrated in FIG. 4A according to one embodiment of the invention. The histogram illustrated in FIG. 4B shows multiple histogram bins, each of which corresponds to the number of features in each of the feature clusters in the image.

Figure 4C:
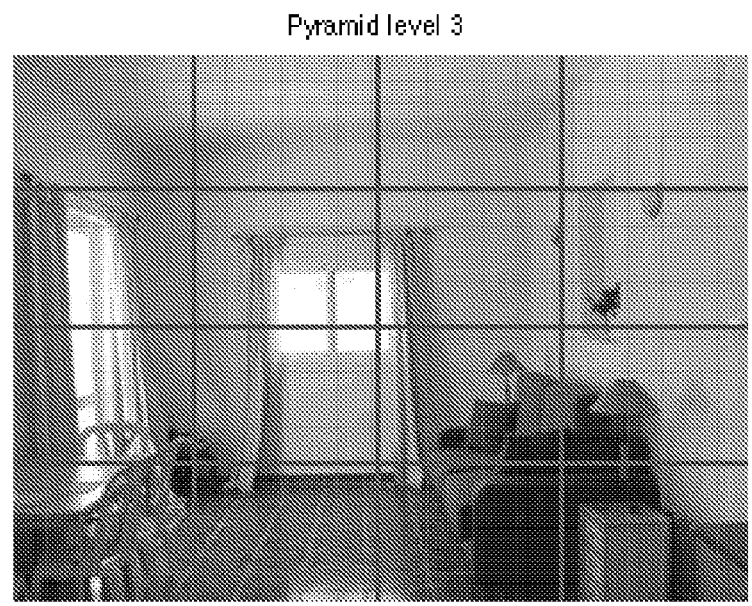
FIG. 4C is an example image at a second spatial resolution to be represented by multiple image histograms.
Figure 4D:
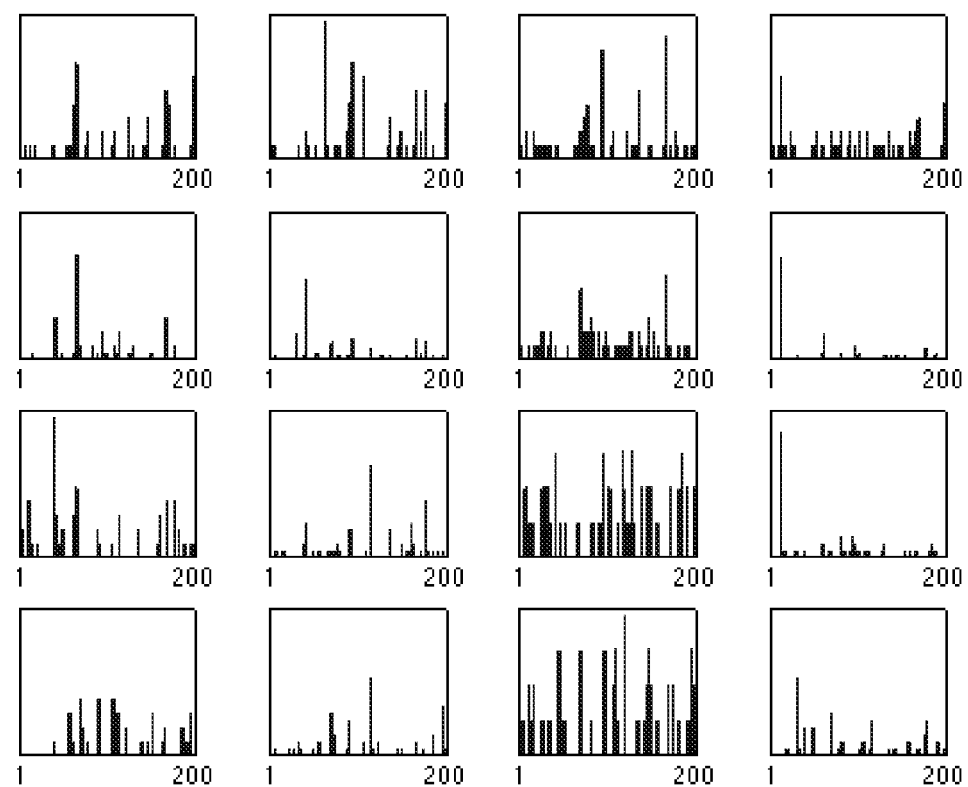
FIG. 4D is a corresponding image histograms of the image illustrated in FIG. 4C according to one embodiment of the invention.

FIG. 4C is an example of the input image illustrated in FIG. 4A at a finer spatial resolution (e.g., pyramid level 3). The input image at pyramid level 1 (e.g., its original spatial resolution) is subdivided into 16 successive resolutions (i.e., the grid illustrated in FIG. 4C), each of which is a sub-image region of the input image. For each of the 16 successive resolutions, the image representation module 126 generates a corresponding spatial histogram based on the clustered SIFT features extracted from the sub-image region. FIG. 4D illustrates the 16 spatial histograms corresponding to the 16 sub-image regions illustrated in FIG. 4C.

The label learning module 128 comprises computer executable instructions for learning place models from the image training set 110. In one embodiment, the label learning module 128 interacts with the image representation module 126 to obtain image histograms generated from the image training set 110, and from the image histograms, the label learning module 128 learns one or more place models. The place labels learned by the label learning module 128 are represented in a form of L place models $M_1, M_2, \ldots M_L$. The learned place models are stored in the data store 160 and are used at runtime to label places recognized in a video sequence. The label learning module 128 is further described below with reference to section of "learning place models using image histograms" and FIG. 7 below.

Figure 1B:
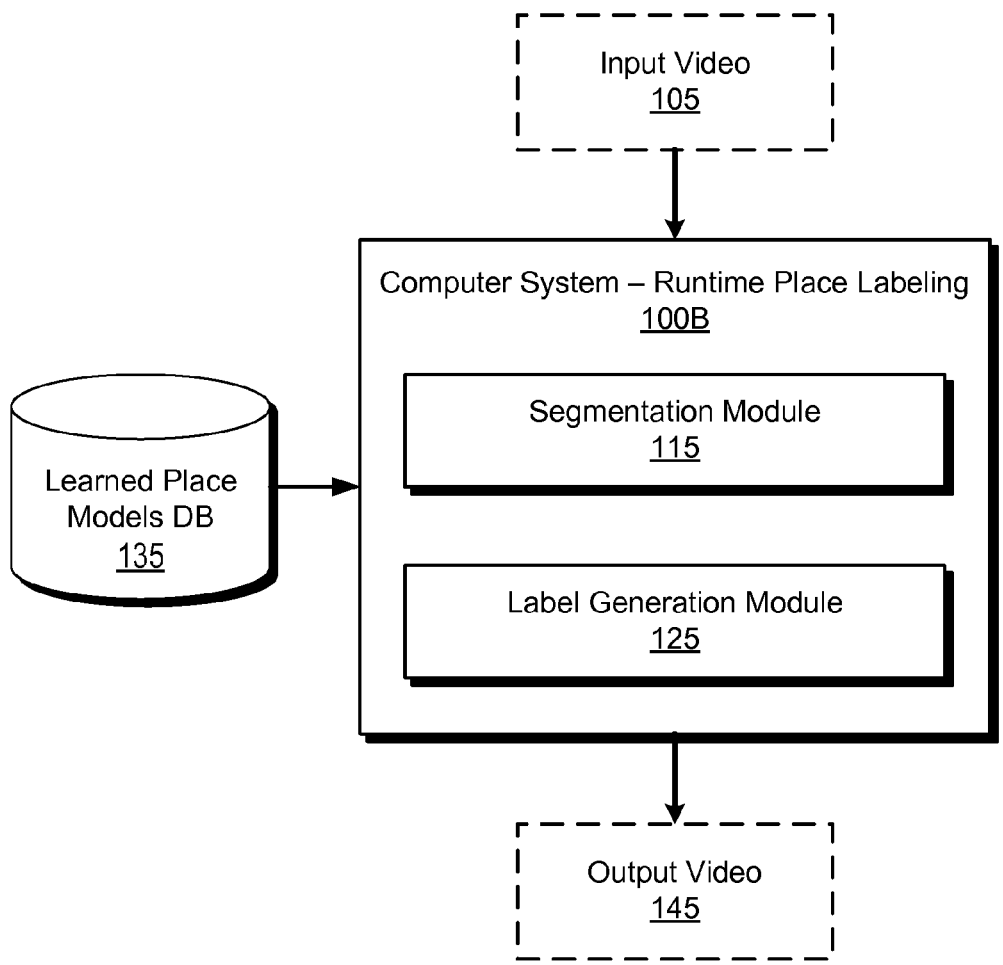
FIG. 1B illustrates a computer system for detecting and labeling places using change-point detection at runtime according to one embodiment of the invention.

FIG. 1B illustrates a computer system for detecting and labeling places using change-point detection at runtime according to one embodiment of the invention. The computer system 100b comprises a learned place models database 135, a segmentation module 115 and a label generation module 125. In one embodiment, the computer system 100B is configured to receive an input video 105 for place labeling and generates an output video 145 with places in the video labeled. The segmentation module 115 generates a measurement stream representing the input video 105 based on the image histograms of the input video 105. The segmentation module 115 computes probabilities of detected change-points in the measurement stream. The label generation module 125 uses the place models stored in the database 135 and the change-points probabilities to label places recognized in the input video 105.

Model-Based Change-Point Detection

The segmentation module 115 is configured to segment a measurement stream representing the input video 105 into non-overlapping and adjacent segments corresponding to places recognized in the input video 105. The measurement stream of the input video 105 is generated based on the image histograms of the input video 105, where the image histograms of the input video 105 are the measurements of the measurement stream. The boundaries between the segments are the change-points. In one embodiment, the segmentation module 115 uses a Bayesian change-point detection method to compute the probability of a change-point occurring at each time-step. The probability of a change-point at any given time-step is obtained by combining a prior on the occurrence of change-points with the likelihood of the current measurement given all the possible scenarios in which change-points could have occurred in the past.

In one embodiment, the segmentation module 115 generates the image histograms of the input video 105 similar to the image representation module 126 illustrated in FIG. 1A except without clustering features of the input video 105. Specifically, the segmentation module 115 uses the extracted features (e.g., image features and/or texture features) of the input video 105 and generates image histograms based on the extracted features at each spatial resolution of the images of the input video 105. Given that the cluster identification for each identified feature of the input video 105 has already been learned offline from the image training set, the segmentation module 115 uses the features extracted from the input video 105 without clustering the features before generating the image histograms.

Assuming that a sequence of input data (e.g., the measurement stream of the input video 105) $y_1, y_2, \ldots y_t$ can be segmented into non-overlapping and adjacent segments. The boundaries between the segments are the change-points. In one embodiment, the change-points are model based, where the form of the probability distribution in each segment remains the same and only the parameter value of the model for the segment changes. Further assuming that the probability distribution data are independent identically distributed (i.i.d) within each segment, $c_t$ denotes the length of the segment at time t. $c_t$ also indicates the time since the last change-point. If the current time-step is a change-point, $c_t=0$, indicating that a new place model is used for the segment. If no change-points have occurred, $c_t=t$.

Denoting the place label at time t as $x_t^c$, the place label $x_t^c$ is indexed by the current segment since the whole segment has a single place label. The place label $x_t^c$ is also updated with each measurement at time t. The probability distribution over $x_t^c$ is taken to be a discrete distribution of size L, one for each of the learned place models.

To obtain the place label $x_t^c$ at time t, a joint posterior on $c_t$ and $x_t^c$ given the probability distribution data, $p(c_t, x_t^c|y_{1:t})$, is computed, where $y_{1:t}$ denotes all the input data from time 1 to time t. The posterior can be factored as Equation 1 below:

$$p(c_t, x_t^c|y_{1:t}) = p(c_t|y_{1:t})p(x_t^c|c_t, y_{1:t}) \quad (1)$$

The first term of Equation (1), $p(c_t|y_{1:t})$, is the posterior over the segment length. Computation of $p(c_t|y_{1:t})$ over the input data from time 1 to time t provides the change-point detection of the input data.

The likelihood of the input data in segment $c_t$ is represented as $p(y_t|\xi_t^c)$ where $\xi_t^c$ is a parameter set. The data inside each segment are assumed to be independent identically distributed (i.i.d) and the parameters are assumed i.i.d according to a prior parameter distribution. The change-point posterior from Equation (1) can be expanded using Bayes law as Equation (2) below:

$$p(c_t|y_{1:t}) \propto p(y_t|c_t, y_{1:t-1})p(c_t|y_{1:t-1}) \qquad (2).$$

The first term of Equation (1) is the data likelihood, and the second term of Equation (2) can be further expanded by marginalizing over the segment length at the previous time step to yield a recursive formulation for $c_t$ as Equation (3) below:

$$p(c_t|y_{1:t-1}) = \sum_{c_{t-1}} p(c_t|c_{t-1})p(c_{t-1}|y_{1:t-1}) \qquad (3)$$

where $p(c_t|c_{t-1})$ is the transition probability, $p(c_{t-1}|y_{1:t-1})$ is the posterior from the previous step, and $c_1, c_2, \ldots c_t$ form a Markov chain.

For characterizing the transition probability $p(c_t|c_{t-1})$ in Equation (3), it is noted that the only two possible outcomes are $c_t=c_{t-1}+1$ when there is no change-point at time t, and $c_t=0$ otherwise. Hence, this is a prior probability on the "lifetime" of this particular segment where the segment ends if a change-point occurs. Using survival analysis, the prior probability predicting the likelihood of occurrence of a change point in a segment can be modeled using a hazard function, which represents the probability of failure in a unit time interval conditional on the fact that failure has not already occurred. If $H(\cdot)$ is a hazard function, the transition probability can be modeled as below in Equation (4):

$$p(c_t|c_{t-1}) = \begin{cases} H(c_{t-1}+1) & \text{if } c_t = 0 \\ 1 - H(c_{t-1}+1) & \text{if } c_t = c_{t-1}+1. \end{cases} \qquad (4)$$

In the special case where the length of a segment is modeled using an exponential distribution with time scale $\lambda$, the probability of a change-point at every time-step is constant so that $H(t)=1/\lambda$.

The data likelihood from Equation (2) can be calculated if the distribution parameter to use is known. Hence, the data likelihood can be integrated over the parameter value using the parameter prior as Equation (5) below:

$$p(y_t|c_t, y_{1:t-1}) = \int_{\xi^c} p(y_t|\xi^c) p(\xi^c|c_t, y^c_{t-1}) \qquad (5)$$

where $\xi^c$ is the model parameter for segment $c_t$, and $y_{t-1}^c$ is the data from the current segment. The above integral can be computed in a closed form if the two distributions inside the integral are in the conjugate-exponential family of distributions.

In one embodiment, the conjugate distribution is used and the integrated function is denoted $p(y_t|c_t, \eta_t^c)$ where $\eta_t^c$ parametrizes the integrated data likelihood. Even though the integrated function $p(y_t|c_t, \eta_t^c)$ is usually not in the exponential family, it can be directly updated using the statistics of the data corresponding to the current segment $\{y_{t-1}^c, y_t\}$. In other words, the integration need not be performed at every step for computing efficiency. In the case where t is a change-point (i.e., $c_t=0$), the integrated function $p(y_t|c_t, \eta_t^c)$ is computed with prior values for $\eta_t^{(0)}$.

As described above, the locations of change-points are obtained by maintaining the posterior over segment lengths $c_t$ for all t. The posterior can be approximated using N weighted particles to obtain a constant runtime computation. Specifically, the segment length posterior can be obtained by combining Equations (2), (3), and (4) as the following:

$$p(c_t|y_{1:t}) \propto \begin{cases} w_t^{(0)} \sum_{c_{t-1}} H(c_{t-1}+1)\rho_{t-1} & \text{if } c_t = 0 \\ w_t^{(c)} \sum_{c_{t-1}} \{1 - H(c_{t-1}+1)\}\rho_{t-1} & \text{if } c_t = c_{t-1}+1 \end{cases} \qquad (6)$$

where $w_t^{(c)}=p(y_t|c_t, y_{t-1}^c)$ and, for the case where t is a change-point and $y_{t-1}^c$ is the empty set, $w_t^{(0)}=p(y_t|c_t)$. $\rho_{t-1}=p(c_{t-1}|y_{1:t-1})$ is the posterior from the previous time-step.

The posterior computed in Equation (6) can be approximated using particle filtering for computing efficiency. For example, the posterior computed in Equation (6) is used with a Rao-Blackwellized particle filer with $w_t$ as the particle weights. The particle weights are given by Equation (5). Since the likelihood parameters $\xi^c$ in Equation (5) are integrated out, Rao-Blackwellized particle filer has lower variance than a standard particle filter, and makes the convergence of the computation of the posterior more efficient.

Figure 3:
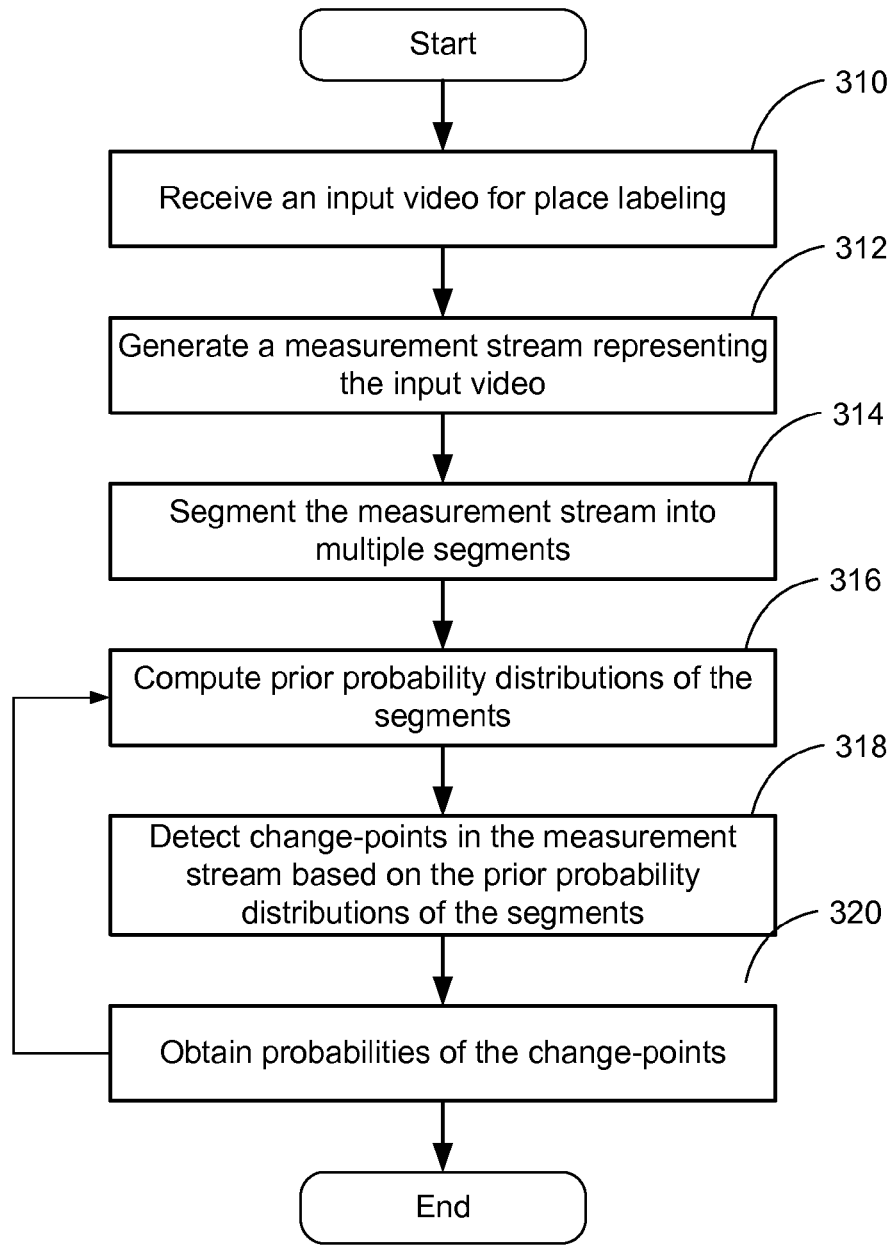
FIG. 3 is a flow chart of video sequence segmentation using change-point detection according to one embodiment of the invention.

FIG. 3 is a flow chart of video sequence segmentation for computing probabilities of detected change-points in an input video according to one embodiment of the invention. Initially, the segmentation module 115 receives 310 an input video for place labeling and generates 312 a measurement stream representing the input video. The image histograms of the input video represent the images of the input video at different spatial resolutions. The segmentation module 115 segments the measurement stream into multiple non-overlapping segments. For each segment, the segmentation module 115 computes 316 prior probability distributions of the image histograms and detects 318 change-points in the segment based on the prior probability distributions. From the detected change-points, the segmentation module 115 obtains 320 the probabilities of the change-points.

Place Lable Inference

The label generation module 125 is configured to assign place labels to places detected in an input video probabilistically. In one embodiment, the label generation module 125 uses statistical hypothesis testing to determine if the current measurement of the measurement stream of the input video could have been generated by any of the pre-learned place models. If the current measurement could not be generated by one of the pre-learned place models, the place associated with the measurement is declared to be a previously unknown place. Thus, the label generation module 125 can systematically recognize a previously unknown place type and assign it a new label if needed.

In one embodiment, the conditional posterior on a place label associated with a segment is represented by the second term, $p(x_t^c|c_t, y_{1:t})$, of Equation (1) given the segment length. The conditional posterior $p(x_t^c|c_t, y_{1:t})$ over the input data from time 1 to time t provides predictions of place labels of the input video. The conditional posterior on the place label $p(x_t^c|c_t, y_{1:t})$ from Equation (1) can be expanded using Bayes law as:

$$p(x_t^c|c_t, y_{1:t}) \propto p(y_t^c|x_t^c, c_t)p(x_t^c|c_t) \qquad (7)$$

where $y_t^c$ is the measurement data in the current segment, i.e. $y_t^c=\{y_{t-c_t}, \ldots, y_t\}$. Using L place models $M_1, M_2, \ldots M_L$, the probabilities of place labels generated by the L place models can be updated using Equation (7). In one embodiment, the label generation module 125 uses the label probability for the segment computed in the previous time-step as the prior, i.e.

$p(x_t^c|c_t)=x_{t-1}^c$. For a new segment with $c_t=0$, the prior can be set to be a uniform distribution over the known place labels.

For detection of an unknown place, the label generation module 125 needs to indicate the place being evaluated is not predicted by any of the known place models. In one embodiment, the label generation module 125 detects unknown place using statistical hypothesis testing. Specifically, at each time-step, the label generation module 125 performs L hypothesis tests to determine whether the place is a known place. If these tests are computationally expensive, the label generation module 125 may perform statistical hypothesis tests once every T time-steps or stop the tests when $c_t>C$ for some large segment length C after which the decision regarding the place label is unlikely to change.

The label generation module 125 considers hypothesis testing for model $M_i$ with parameter vector $\eta$ so that the exact probability under this place model is $p_0=p(y_t^c|\eta)$. The indication of the observed data is the probability, $p_o=\Sigma_{p(y|\eta)\leq p_0} p(y|\eta)$, of all the data that is equally or less probable under $\eta$. The label generation module 125 approximates the probability $p_o=\Sigma_{p(y|\eta)\leq p_0} p(y|\eta)$ using the likelihood ratio where the ratio of the place model under the maximum likelihood parameter value and the true parameter value is computed below in Equation (8):
where $\eta_{mi}=\arg\max_\eta p(y_t^c|\eta)$.

$$R = \frac{p_0}{p(y_t^c|\eta_{ml})} \quad (8)$$

The statistic used in the hypothesis test is $-2\ln R$, where R is the likelihood ratio in Equation (8). This statistic can be shown to converge to the Chi-squared distribution with $k-1$ degrees of freedom, where k represents the dimensions of the parameter vector $\theta$. The place model $M_i$ can be rejected if the Chi-squared probability is less than a threshold, which is usually set at 5% (0.05) or 1% (0.01). The test statistic converges to the Chi-squared distribution at the rate of $O(N^1)$, where N is the number of measurements used to compute the maximum likelihood parameter value $\eta_{mi}$.

The label generation module 125 performs the statistical hypothesis testing for each known place model and declares the place to be previously unknown if the tests reject all of the known place models. Since the Chi-squared probabilities from the hypothesis testing do not say anything about the probability of the new label, the place distribution is set to a prior value for unknown places $p(x|\text{new label})$. The new place label can be either stored for future reference along with the maximum likelihood model parameters $\eta_{mi}$, or be discarded if new places are of no interest.

In terms of implementation, the label generation module 125 augments the change-point detection described above so that the discrete distribution on places is stored with each segment $c_t$. Similarly, in change-point detection with particle filtering, each particle maintains a place distribution. The place distribution becomes increasingly confident as the length of the segment $c_t$ increases and is robust to image noise and outliers. The cost of updating the place distribution is linear in the number of labels and hence, does not affect the runtime of the change-point detection.

Learning Place Models using Image Historgrams

A place model is used to compute the data likelihood in Equation (5). In one embodiment as illustrated in FIG. 1A, the label learning module 128 learns multiple place models offline from the image training set 110. Since the measurements are image histograms of image features, the label learning module 128 models the measurements using a multinomial distribution having dimensions equal to size of the codebook comprising the image features learned from the image training set 110. In one embodiment, the label learning module 128 uses conjugate Dirichlet distribution (e.g., Dirichlet Compound Multinomial (DCM) distribution) to represent the prior over the multinomial parameter. Given a histogram measurement y, its data likelihood according to Equation (5) is $$P(y|\alpha) = \int_\theta P(y|\theta) P(\theta|\alpha) \quad (9)$$

where $\theta=[\theta_1, \theta_2, \ldots, \theta_W]$ and $\alpha=[\alpha_1, \alpha_2, \ldots, \alpha_W]$ are the multinomial parameter and Dirichlet prior respectively, and W is the codebook size.

Assuming that the histogram measurement y has bin counts given by $[n_1, n_2, \ldots, n_W]$, the distributions in the integrand above can be written as $$p(y|\theta) = \frac{n!}{n_1! n_2! \ldots n_W!} \theta_1^{n_1} \theta_2^{n_2} \ldots \theta_W^{n_W} \quad (10)$$

$$p(\theta|\alpha) = \frac{\Gamma\left(\sum_{w=1}^W \alpha_w\right)}{\left(\sum_{w=1}^W \Gamma(\alpha_w)\right)} \theta_1^{\alpha_1-1} \theta_2^{\alpha_2-1} \ldots \theta_W^{\alpha_W-1} \quad (11)$$

where $P(y|\theta)$ is a multinomial distribution and $P(\theta|\alpha)$ is a Dirichlet distribution. The likelihood model in Equation (9) is called the Multivariate Polya Model, where a quantized image feature that appears once is more likely to appear multiple times in the entire input video stream.

Performing the integration in Equation (9) gives the final form of the histogram measurement likelihood, which is the place model to be learned, as $$P(y|\alpha) \propto \frac{n!}{\prod_{w=1}^W n_w} \frac{\Gamma(|\alpha|)}{\Gamma(n+|\alpha|)} \prod_{w=1}^W \frac{\Gamma(n_w+\alpha_w)}{\Gamma(\alpha_w)} \quad (12)$$

where $n=\Sigma_w n_w$, $|\alpha|=\Sigma_w \alpha_w$ and $\Gamma(.)$ denotes a Gamma function. If the likelihood of a set of measurements is to be computed, then n is taken to be the total counts across all measurements, while $n_W$ is the total count for a particular image feature.

Figure 7:
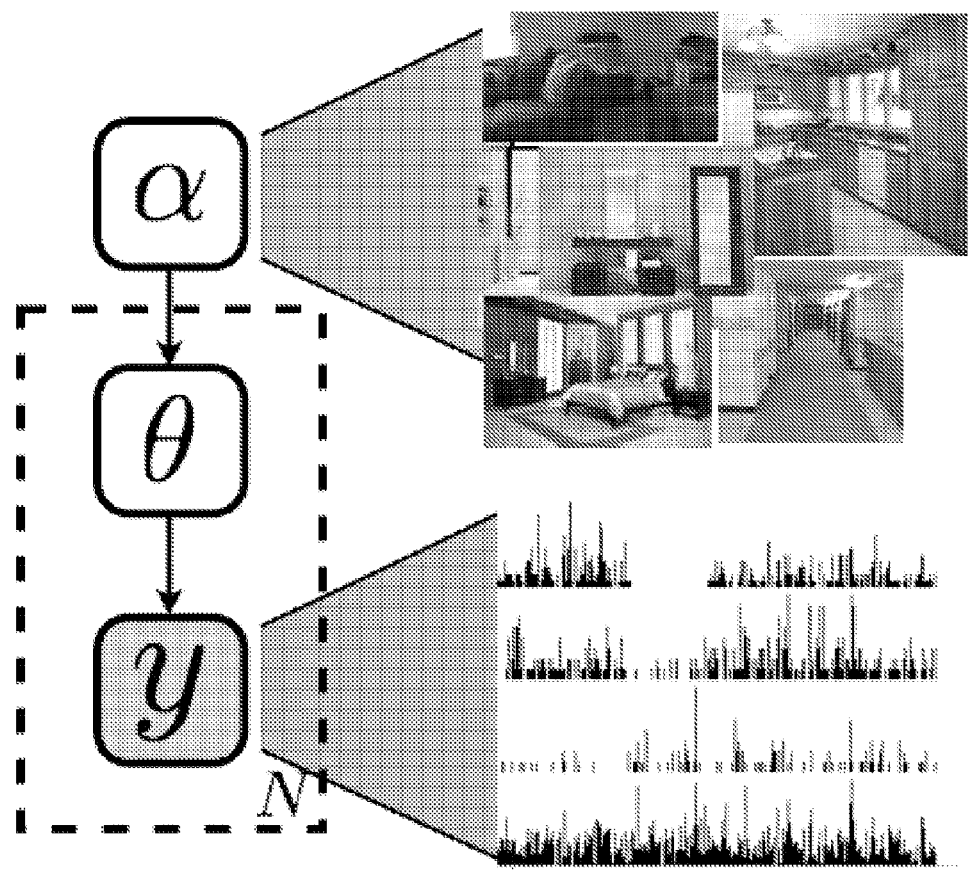
FIG. 7 is an illustration of labeling places using change-point detection based on Multivariate Polya distribution.

FIG. 7 illustrates an example of generating place labels by the label generation module 125 at runtime using change-point detection based on Multivariate Polya distribution. To obtain a quantized feature histogram, the label generation module 125 samples from a Dirichlet distribution with parameter $\alpha$ to obtain a multinomial vector $\theta$ using Equations (10) and (11). Each Dirichlet parameter $\alpha$ corresponds to a place or place category (e.g., kitchen, office, bedroom, etc). The multinomial distribution represented by $\theta$ is sampled to obtain the histogram measurement y over all the bin counts N associated with the histogram measurement y. The histogram measurement likelihood of y, which is the place model to be learned, is calculated by the label generation module 125 using Equation (12).

Given a set of D images with features detected from the images, the maximum likelihood value for a multinomial parameter $\alpha$ can be learned by using iterative gradient descent optimization. It can be shown that this leads to the following fixed point update for the $\alpha$ parameter:

$$\alpha_w^{new} = \alpha_w \frac{\sum_{d=1}^{D} \psi(n_{dw} + \alpha_w) - \psi(\alpha_w)}{\sum_{d=1}^{D} \psi(n_{dw} + \alpha) - \psi(\alpha)} \quad (13)$$

where $\alpha = \Sigma_w \alpha_w$ as before, and $\Psi(\cdot)$ is a Digamma function, the derivative of the Gamma function.

The label learning module 128 uses the DCM distributions as place models in change-point detection. The multinomial parameter $\alpha$ for each place is learned from labeled images in an offline training phase. During runtime, the distribution is used to compute the data likelihood in Equation (5), and the $\alpha$ parameter is also updated after each measurement using the iterative rule in Equation (13). This facilitates runtime place label learning, and if runtime place label learning is not required, the updated parameter can be discarded at the end of the segment.

To reduce computation load, the place label learning module 128 uses the spatial pyramids of image histograms at the finest level of an input video as input. Thus, for a pyramid with V levels and level V=0 denoting the whole image, the dimensions of multinomial parameter $\alpha$ is $4^V W$, where W is the size of codebook of image features. The expression for the hypothesis testing statistic, which is $-2\ln R$, can also be obtained by substituting the distribution expression in Equation (12) into the likelihood ratio Equation (8).

Table I below illustrates a summary of particle filtering using the DCM model

TABLE I

Particle Filtering Using DCM Model

1. Initialize: Set prior parameter $\alpha_0$ to be the maximum likelihood value of the DCM parameter on image training set. For all particles, $c_0 = 0$ and $x_0^0 =$ unif (unif: unified distribution over known labels).
2. Update particle set:
For every time-step t do:
For every particle containing weight, segment length, label distribution, and DCM parameter $\{w_{t-1}, c_{t-1}, x_{t-1}^c, \alpha_{t-1}^c\}$ do
2.1: Create two new particles:
no change-point case: $l_1 = \{w_{t-1}, c_{t-1} + 1, x_{t-1}^c, \alpha_{t-1}^c\}$
change-point case: $l_2 = \{w_{t-1}, 0, \text{unif}, \alpha_{t-1}^c\}$
2.2: Compute the prior for the transition probability in Equation (4) and update weights $l_1$ and $l_2$
2.3: Using $y_t$, learn new parameter $\alpha_t^c$, using Equation (13) for $l_1$, and set parameter $\alpha_t^0$ for $l_2$ to $\alpha_0$
2.4: Compute incremental weights for $l_1$ and $l_2$ using particle weight definition in Equation (8) and DCM likelihood function in Equation (12) and multiply with particle weights
3. Resample from weights to get new set of particles
4. Update place distributions:
For every particle $\{w_t, c_t, x_{t-1}^c, \alpha_t^c\}$ do
4.1: Perform a statistical hypothesis test using the likelihood ratio test defined in Equation (8) for each known place model
4.2: If a test indicates $y_t^c$ to be arising from an existing place category, update $x_{t-1}^c$ using Equation (7) to get $x_t^c$
4.3: If all existing place models are rejected, create new place label and set $x_t^c$ to the prior distribution p(x|new label)

Figure 5:
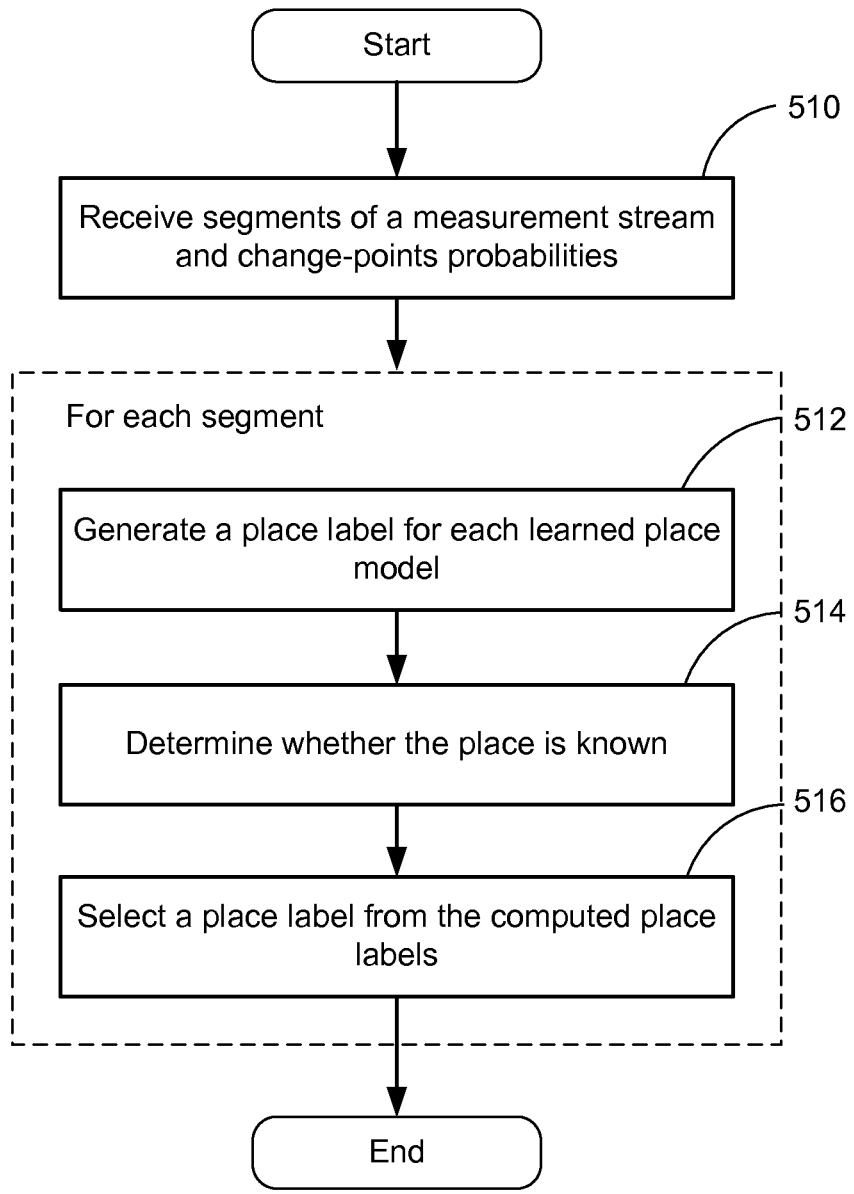
FIG. 5 is a flowchart of generating place labels using change-point detection based on Multivariate Polya distribution.

FIG. 5 is a flowchart of generating place labels by the label generation module 125 at runtime using change-point detection based on Multivariate Polya distribution. Initially, the label generation module 125 interacts with the segmentation module 115 to receive 510 the segments of a measurement stream of an input video. For each segment, the label generation module 125 generates 512 a place label associated with the segment by computing the conditional posterior on the place label using the learned place models. For each learned place model, the label generation module 125 computes the probability of the place label being generated by the learned place model. Based on the probabilities generated with respect to all the learned place models, the label generation module 125 determines 514 the place is unknown to the learned place models. For example, if the probabilities of the place label generated by all the learned place models are below a threshold value, the label generation module determines that the place is unknown to the learned place models, i.e., the place requires a new place label.

For a place that is recognized by one or more place models, the label generation module 125 selects a place label based on the probabilities of the place label generated by all the learned place models. In one embodiment, the label generation module 125 selects the place label having the largest probability. For example, if a place is recognized by three place models corresponding to "kitchen," "living room" and "office," respectively, and the probability for the place being a kitchen is 0.8, the probability of being an office is 0.4 and the probability of being a living room is 0.1, the label generation module 125 selects kitchen as the place label for the place.

Experiments and Applications

FIG. 6A is a block diagram of an example experimental result of labeling places using change-point detection according to one embodiment of the invention. The top row 610a represents the thumbnails of images being tested. The middle row 620a shows ground truth of place labels for the images shown in top row 610a. There are five categories of places: living room, office, transition, meeting room 1 and meeting room 2. Place category "transition" means a place model for this place category is not learned during place model learning phase. At runtime, a frame of an input video not belonging to one of the above known place labels (e.g., living room, office, meeting room 1 meeting room 2) is labeled as a "transition" frame. The bottom row 630a shows the place labeling results. Comparing with the ground truth of place labels shown in row 620a, part of the meeting room 1 in the input video is misidentified as transition, but the overall accuracy of the place labeling is high.

Figure 6B:
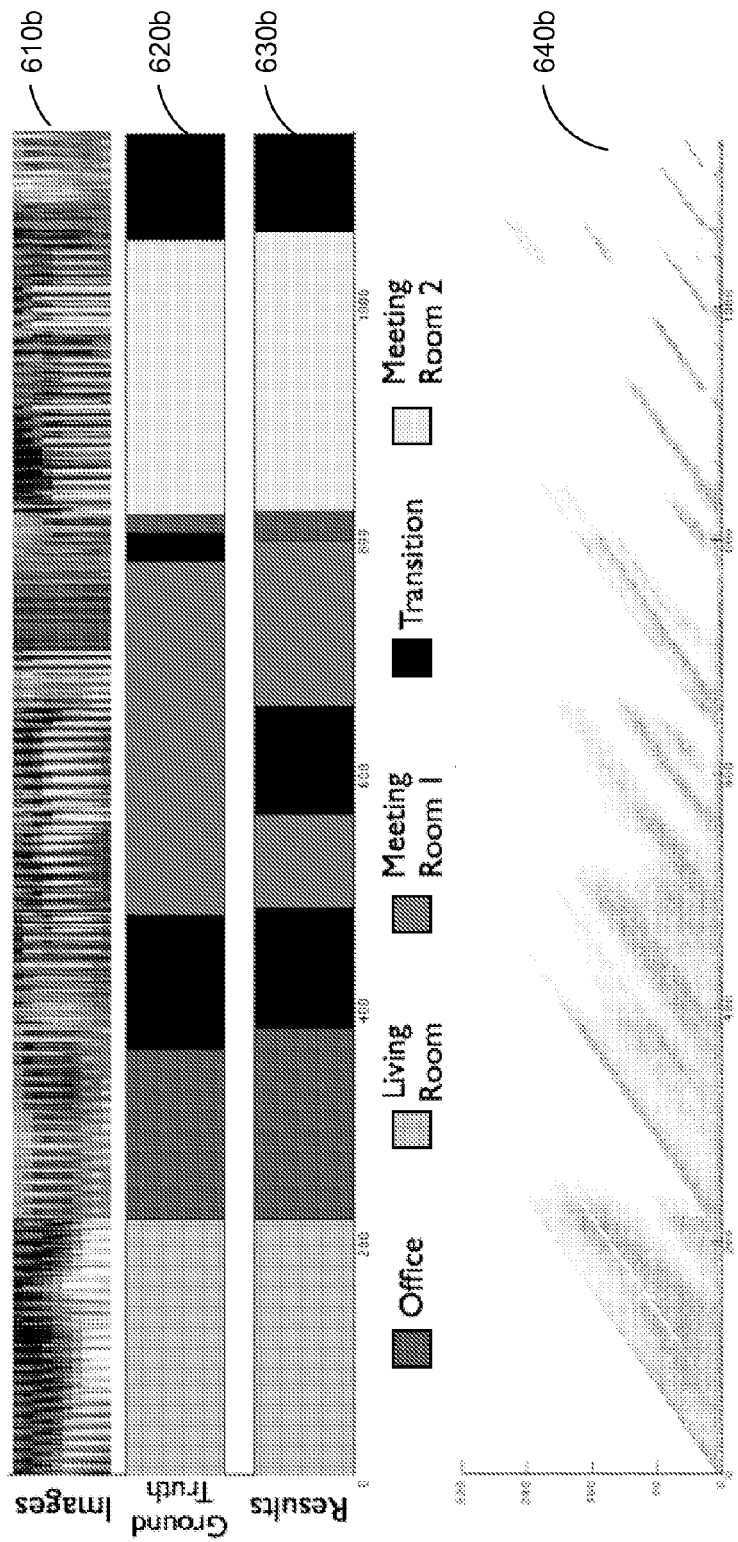
FIG. 6B is an example experimental result of labeling places using change-point detection according to one embodiment of the invention.

FIG. 6B is an example experimental result of labeling places using change-point detection according to one embodiment of the invention. FIG. 6B show an experimental result for a video sequence comprising 1043 frames with 5 pre-learned labels for kitchen, office, meeting room 1, meeting room 2 and transition. Top row 610*b* shows 10 pixels by 10 pixels thumbnails of the frames of the video sequence. The middle row 620*b* shows the ground truth of the place labels for places recognized in the video sequence. The third row 630*b* shows the place labels generated by one embodiment of the place recognition system. The bottom row 640*b* shows the corresponding change-point posterior on segment lengths of segments of the video sequence.

While particular embodiments and applications of the invention have been illustrated and described herein, it is to be understood that the invention is not limited to the precise construction and components disclosed herein and that various modifications, changes, and variations may be made in the arrangement, operation, and details of the methods and apparatuses of the invention without departing from the spirit and scope of the invention as it is defined in the appended claims

What is claimed is:

1. A computer implemented method for labeling places recognized in a video stream, the method comprising:
   receiving a video stream comprising multiple digital representations of images;
   generating a measurement stream comprising one or more image histograms of the video stream, wherein generating the measurement stream comprises, for each image of the video stream:
      extracting image features from the image;
      generating one or more image histograms based on the extracted image features associated with the image, wherein each bin of an image histogram indicates the frequency of quantized image features in the image; and
      generating a spatial pyramid of image histograms associated with the image, wherein the spatial pyramid of image histograms associated with the image is a measurement of the image in the measurement stream;
   segmenting the measurement stream into a plurality of segments corresponding to types of places in the video stream based on the histograms of the videos stream, wherein the boundary between two adjacent segments represents a change-point of the measurement stream at a time-step;
   computing probability distributions of the segments over a plurality of place models, wherein probability of a segment represents a likelihood that the segment is recognized by a place model of the plurality of the place models; and
   generating place labels for the types of places recognized in video stream based on probabilities of change-points of the measurement stream, wherein the change-points are detected based on the probability distributions of the segments over the plurality of place models.

2. The method of claim 1, wherein generating one or more image histograms of the image of the videos stream comprises:
   dividing the image into a plurality of sub-images, wherein each sub-image has a smaller spatial resolution than the spatial resolution of the image;
   for each sub-image, generating one or more image histograms based on image features associated with the sub-image.

3. The method of claim 1, wherein segmenting the measurement stream comprises:
   dividing the segment stream into a plurality of non-overlapping and adjacent segments;
   modeling the change-points of the measurement stream by the plurality of the place models.

4. The method of claim 1, further comprising learning the plurality of place models from a plurality of image representations of images of an image training set.

5. The method of claim 4, wherein learning the plurality of place models comprises:
   extracting image features of the images of the image training set, wherein the types of places recognized in each image of the image training set is pre-labeled;
   clustering the extracted images features to create a codebook of a plurality of code words, wherein a code word is represented by a cluster identification of quantized image features associated with the code word;
   generating one or more image histograms for each image of the image training set, wherein each bin of an image histogram indicates the frequency of quantized image features in the image.

6. The method of claim 1, wherein generating place labels for the types of places recognized in video stream comprises:
   generating a place label for each segment of the measurement stream, wherein the place label has a probability indicting that the segment is recognized by one of the plurality of the place models;
   comparing the probabilities for the segment recognized by the one or more place models;
   selecting the place label that has the largest probability by one of the plurality of the place models.

7. The method of claim 1, wherein generating place labels for the types of places recognized in video stream further comprises:
   responsive to a segment not recognized by the plurality of place models:
      determining the segment corresponding to a place unknown to the plurality of the place models; and
      assigning a new place label to the segment.

8. A computer system for labeling places recognized in a video stream, the system comprising:
   a segmentation module configured to:
      receive a video stream comprising multiple digital representations of images;
      generate a measurement stream comprising one or more image histograms of the video stream, wherein generating the measurement stream comprises, for each image of the video stream:
         extracting image features from the image;
         generating one or more image histograms based on the extracted image features associated with the image, wherein each bin of an image histogram indicates the frequency of quantized image features in the image; and
         generating a spatial pyramid of image histograms associated with the image, wherein the spatial pyramid of image histograms associated with the image is a measurement of the image in the measurement stream;
      segment the measurement stream into a plurality of segments corresponding to types of places in the video stream based on the histograms of the videos stream, wherein the boundary between two adjacent segments represents a change-point of the measurement stream at a time-step;
      compute probability distributions of the segments over a plurality of place models, wherein probability of a segment represents a likelihood that the segment is recognized by a place model of the plurality of the place models; and a place label generation module configured to:
generate place labels for the types of places recognized in video stream based on probabilities of change-points of the measurement stream, wherein the change-points are detected based on the probability distributions of the segments over the plurality of place models.

9. The system of claim 8, wherein the segmentation module is further configured to:
divide the image into a plurality of sub-images, wherein each sub-image has a smaller spatial resolution than the spatial resolution of the image;
for each sub-image, generate one or more image histograms based on image features associated with the sub-image.

10. The system of claim 9, wherein the segmentation module is further configured to:
divide the segment stream into a plurality of non-overlapping and adjacent segments;
model the change-points of the measurement stream by the plurality of the place models.

11. The system of claim 8, further comprising a label learning module configured learn the plurality of place models from a plurality of image representations of images of an image training set.

12. The system of claim 11, wherein comprising:
a feature detection module configured to extract image features of the images of the image training set, wherein the types of places recognized in each image of the image training set is pre-labeled;
a feature clustering module configured to cluster the extracted images features to create a codebook of a plurality of code words, wherein a code word is represented by a cluster identification of the quantized image features associated with the code word;
an image representation module configured to generate one or more image histograms for each image of the image training set, wherein each bin of an image histogram indicates the frequency of quantized image features in the image.

13. The system of claim 8, wherein the label generating module is further configured to:
generate a place label for each segment of the measurement stream, wherein the place label has a probability indicting that the segment is recognized by one of the plurality of the place models;
compare the probabilities for the segment recognized by the one or more place models;
select the place label that has the largest probability by one of the plurality of the place models.

14. The system of claim 8, wherein the label generation module is further configured to:
responsive to a segment not recognized by the plurality of place models:
determine the segment corresponding to a place unknown to the plurality of the place models; and
assign a new place label to the segment.

15. A non-transitory computer program product for labeling places recognized in a video stream, the computer program product comprising a non-transitory computer-readable medium containing computer program code for performing the operations:
receiving a video stream comprising multiple digital representations of images;
generating a measurement stream comprising one or more image histograms of the video stream, wherein generating the measurement stream comprises, for each image of the video stream:
extracting image features from the image;
generating one or more image histograms based on the extracted image features associated with the image, wherein each bin of an image histogram indicates the frequency of quantized image features in the image; and
generating a spatial pyramid of image histograms associated with the image, wherein the spatial pyramid of image histograms associated with the image is a measurement of the image in the measurement stream;
segmenting the measurement stream into a plurality of segments corresponding to types of places in the video stream based on the histograms of the videos stream, wherein the boundary between two adjacent segments represents a change-point of the measurement stream at a time-step;
computing probability distributions of the segments over a plurality of place models, wherein probability of a segment represents a likelihood that the segment is recognized by a place model of the plurality of the place models; and
generating place labels for the types of places recognized in video stream based on probabilities of change-points of the measurement stream, wherein the change-points are detected based on the probability distributions of the segments over the plurality of place models.

16. The computer program product of claim 15, wherein the computer program code for generating one or more image histograms of the image of the videos stream comprises computer program code for:
dividing the image into a plurality of sub-images, wherein each sub-image has a smaller spatial resolution than the spatial resolution of the image;
for each sub-image, generating one or more image histograms based on image features associated with the sub-image.

17. The computer program product of claim 15, wherein the computer program code for segmenting the measurement stream comprises computer program code for:
dividing the segment stream into a plurality of non-overlapping and adjacent segments;
modeling the change-points of the measurement stream by the plurality of the place models.

18. The computer program product of claim 15, further comprising computer program code for learning the plurality of place models from a plurality of image representations of images of an image training set.

19. The computer program product of claim 18, wherein the computer program code for learning the plurality of place models comprises computer program code for:
extracting image features of the images of the image training set, wherein the types of places recognized in each image of the image training set is pre-labeled;
clustering the extracted images features to create a codebook of a plurality of code words, wherein a code word is represented by a cluster identification of quantized image features associated with the code word;
generating one or more image histograms for each image of the image training set, wherein each bin of an image histogram indicates the frequency of quantized image features in the image.

20. The computer program product of claim 15, wherein computer program code for generating place labels for the types of places recognized in video stream comprises computer program code for:
- generating a place label for each segment of the measurement stream, wherein the place label has a probability indicting that the segment is recognized by one of the plurality of the place models;
- comparing the probabilities for the segment recognized by the one or more place models;
- selecting the place label that has the largest probability by one of the plurality of the place models.

21. The computer program product of claim 15, wherein the computer program code for generating place labels for the types of places recognized in video stream further comprises computer program code for:
- responsive to a segment not recognized by the plurality of place models:
    - determining the segment corresponding to a place unknown to the plurality of the place models; and
    - assigning a new place label to the segment.

* * * * *

UNITED STATES PATENT AND TRADEMARK OFFICE
CERTIFICATE OF CORRECTION

PATENT NO. : 8,565,538 B2  Page 1 of 1
APPLICATION NO. : 13/044287
DATED : October 22, 2013
INVENTOR(S) : Ananth Ranganathan It is certified that error appears in the above-identified patent and that said Letters Patent is hereby corrected as shown below:

In the Claims

Column 15, Claim 1, line 43, delete "videos" and insert --video--.
Column 15, Claim 1, line 53, delete "in video" and insert --in the video--.
Column 15, Claim 2, line 58, delete "videos" and insert --video--.
Column 16, Claim 6, line 22, delete "in video" and insert --in the video--.
Column 16, Claim 6, line 25, delete "indicting" and insert --indicating--.
Column 16, Claim 7, line 32, delete "in video" and insert --in the video--.
Column 16, Claim 8, line 61, delete "videos" and insert --video--.
Column 17, Claim 8, line 6, delete "in video" and insert --in the video--.
Column 17, Claim 11, line 26, delete "configured learn" and insert --configured to learn--.
Column 17, Claim 12, line 35, delete "images" and insert --image--.
Column 17, Claim 12, line 37, delete "of the quantized" and insert --of quantized--.
Column 17, Claim 13, line 47 - 48, delete "indicting" and insert --indicating--.
Column 18, Claim 15, line 17, delete "videos" and insert --video--.
Column 18, Claim 15, line 27, delete "in video" and insert --in the video--.
Column 18, Claim 16, line 33, delete "videos" and insert --video--.
Column 18, Claim 19, line 58, delete "images" and insert --image--.
Column 19, Claim 20, line 3, delete "in video" and insert --in the video--.
Column 19, Claim 20, line 7, delete "indicting" and insert --indicating--.
Column 19, Claim 21, line 15, delete "in video" and insert --in the video--.

Signed and Sealed this
Twenty-sixth Day of August, 2014

Michelle K. Lee
*Deputy Director of the United States Patent and Trademark Office*